3,408,206
5'-NUCLEOTIDES SEASONING AGENTS
Akihiro Yamazaki, Izumi Kumashiro, Tetsuya Kato, and Takashi Meguro, Kanagawa-ken, Tado Takenishi, Tokyo, Masaharu Yoshikawa and Tsunehiko Ninomiya, Kanagawa-ken, Shizuko Yamaguchi and Yasushi Komata, Tokyo, Takaomi Saito, Kanagawa-ken, and Shingo Ikeda, Tokyo, Japan, assignors to Ajinomoto Co., Inc., Tokyo, Japan
No Drawing. Filed Jan. 6, 1966, Ser. No. 518,986
Claims priority, application Japan, Jan. 11, 1965, 40/1,066, 40/1,067; Sept. 4, 1965, 40/54,147; Sept. 11, 1965, 40/55,540; Oct. 5, 1965, 40/60,866
9 Claims. (Cl. 99—140)

ABSTRACT OF THE DISCLOSURE

The 5'-monophosphates of 2-methylinosine, 2-ethylinosine, 2-methylmercaptoinosine, 2-ethylmercaptoinosine, 2-N-methylguanosine and 2-N,N-dimethylguanosine and their water-soluble, physiologically tolerated salts do not occur in nature and strongly enhance the flavor of foods, beverages, and seasonings, particularly when used in conjunction with monosodium glutamate.

This invention relates to novel 5'-nucleotides which are capable of improving the taste of food, and to methods of preparing them and of using the same as seasoning agents.

The seasoning agents of the invention are 5'-nucleotides of the formula

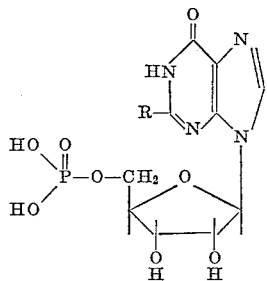

wherein R may be methylmercapto, ethylmercapto, methyl, ethyl, methylamino, or dimethylamino. They have been found to be obtainable in high yields from the corresponding 2-substituted inosine derivatives by reaction with phosphorylating agents.

The 5'-nucleotides of the invention will be referred to by abbreviations as follows:

2-methylmercaptoinosine-5'-monophosphate=MeS-IMP
2-ethylmercaptoinosine-5'-monophosphate=EtS-IMP
2-methylinosine-5'-monophosphate=Me-IMP
2-ethylinosine-5'-monophosphate=Et-IMP
2-N-methylguanosine-5'-monophosphate=Me-GMP
2-N,N-dimethylguanosine-5'-monophosphate=DiMe-GMP The nucleotides referred to above have a pleasant taste, and are particularly effective in improving the taste of beverages or other food when used jointly with L-glutamic acid or L-homocysteic acid. The physiologically acceptable water-soluble and edible salts of these nucleotides may be used interchangeably with the free acid.

The nucleotides of the invention are not only stronger seasoning agents than 5'-inosinic acid or 5'-guanylic acid with which they are chemically closely related, but they resist the deteriorating effects of enzymes commonly present in foods to a surprising extent, and are far superior to the related natural 5'-nucleotides in this respect.

The starting materials for preparing the above nucleotides are listed below, togethed with abbreviations which will be used hereinafter for convenience:

2-methylmercapto-inosine=MeS-HxR
2-methylmercapto-2',3'-O-isopropylideneinosine=Ip-MeS-HxR
2-ethylmercapto-inosine=EtS-HxR
2-ethylmercapto-2',3'-O-isopropylideneinosine=Ip-EtS-HxR
2-methylinosine=Me-HxR
2-methyl-2',3'-O-isopropylideneinosine=Ip-Me-HxR
2-ethylinosine=Et-HxR
2-ethyl-2',3'-isopropylideneinosine=Ip-Et-HxR
2-N-methyl-guanosine=Me-GR
2-N-methyl-2',3'-isopropylideneguanosine=Ip-Me-GR
2-N,N-dimethylguanosine=DiMe-GR
2-N,N-dimethyl-2',3'-O-isopropylideneguanosine=Ip-DiMe-GR These starting materials may be prepared by the following methods:

2-mercaptoinosine is prepared from 5-amino-4-carbamoyl-1-β-D-ribofuranosylimidazole (AICAR) by a reaction with an alkali metal alkyl xanthate. The 2-mercaptoinosine may be methylated to form MeS-HxR, or ethylated to EtS-HxR. When 2-mercaptoinosine is treated with an oxidizing agent and then with methylamine, Me-GR is produced. When dimethylamine is substituted for the methylamine, the product is DiMe-GR.

AICAR reacts with alkyl acetates in the presence of alkali metal alcoholates to form Me-HxR, and Et-HxR is obtained when an alkyl propionate is substituted for the alkyl acetate. Me-HxR may also be prepared by heating AICAR with an alkyl orthoacetate.

The corresponding isopropylidene derivatives are obtained by substituting 5-amino-4-carbamoyl-1-(2',3'-O-isopropylidene-β-D-ribofuranosyl)-imidazole (Ip-AICAR) for AICAR in the above reactions.

Suitable phosphorylating agents for converting the 2-substituted inosine derivatives into the corresponding nucleotides include the chlorides of phosphorus and phosphoric acid and related compounds, such as phosphoryl chloride and phosphorus pentachloride, tetrachloropyrophosphate, arylphosphochloridates (p-nitrophenylphosphorodichloridate, diphenylphosphorochloridate). Phosphoryl chloride and tetrachloropyrophosphate have been found superior to other chlorine bearing phosphorus compounds.

The phosphorylation reaction is best performed in the presence of chlorides of polyvalent metals, such as ferric or aluminum chloride, of a small amount of water or an alcohol, such as methanol, ethanol, or propanol, or a lower tertiary alkyl ester of phosphoric acid, such as trimethylphosphate, or the corresponding ethyl or propyl esters.

The phosphorylation agent is preferably employed in a substantial excess over the stoichiometric amount, and the temperature is best kept between −20° C., and 20° C.

The nucleotides are recovered from the phosphorylation mixture by dissolving the latter in ice water. An isopropylidene group present may be removed by hydrolysis at this stage. If large amounts of unreacted phosphorylating agent or solvent are present, they may be removed by solvent extraction from the reaction mixture before dissolving the latter in water. MeS-IMP, EtS-IMP, Me-IMP, Et-IMP, Me-GR, and DiMe-GR form metal salts, and are readily recovered from the aqueous system as such salts.

The following examples further illustrate the preparation of the nucleosides and nucleotides referred to above.

Example 1

2.58 grams (10 millimoles) AICAR were dissolved in 100 ml. hot methyl alcohol, and 4.8 g. (30 millimoles) potassium ethyl xanthate were added to the solution. The mixture was heated to 170° C. for 2 hours in a sealed tube. After cooling, 100 ml. water were added to the reaction mixture. The pH of the aqueous solution was adjusted to about 3 by adding 20 ml. Amberlite IR-120 of the hydrogen ion type. The resin was removed by filtration, 20 ml. concentrated ammonia solution were added to the filtrate, and the filtrate was decolorized with activated charcoal. The decolorized solution was evaporated under reduced pressure, unreacted AICAR was removed from the residue by extraction with methyl alcohol, and the residue was recrystallized from water. The purified crystals obtained weighed 2.1 g. (66.2%) and were identified as the ammonium salt of 2-mercaptoinosine.

An elementary analysis of the crystals had the following results:

Calculated for $C_{10}H_{15}O_5N_5S$: C, 37.55%; H, 4.99%; N, 22.53%. Found: C, 37.86%; H, 4.73%; N, 22.08%.

Ultra-violet absorption spectra of the crystals showed $\lambda_{max.}$ 231.5 and 294 m$\mu$ at pH 1, $\lambda_{max.}$ 234 and 289 m$\mu$ at pH 13, and $\lambda_{max.}$ 296 m$\mu$ at pH 6.

A single spot of Rf value 0.43 was detected on a paper chromatogram made with a mixed solvent of n-propanol-conc. ammonia-water (20:12:3 parts by volume), and also a single spot of Rf value 0.62 was obtained by a mixed solvent of n-butanol-acetic acid-water (4:1:1 parts by volume).

One gram of the ammonium salt of 2-mercaptoinosine was dissolved in 10 ml. water, and 5.27 g. (3.72 millimoles) methyl iodide were added dropwise to the solution, whereupon the mixture was stirred for one hour at room temperature. The reaction solution was neutralized with acetic acid, and the crude crystals precipitated were recovered by filtration. They were recrystallized from water to give 0.713 g. of pure crystalline 2-methylmercaptoinosine, which melted and decomposed at 237° C.

A specific rotatory power of the crystals as determined in aqueous solution at 26.5° C. in the sodium D line was −51.9° (C=1).

Ultraviolet absorption spectra of the crystals showed $\lambda_{max.}$ 265 m$\mu$ at pH 1, $\lambda_{max.}$ 262 and 280 m$\mu$ (shoulder) at pH 6.9, and $\lambda_{max.}$ 272 m$\mu$ at pH 13.

An elementary analysis of the crystals was consistent with the assumed structure.

Calculated for $C_{11}H_{14}O_5N_4S$: C, 42.04%; H, 4.49%; N, 17.82%; S, 10.18%. Found: C, 42.17%; H, 4.65%; N, 17.99%; S, 10.40%.

Example 2

138 ml. dry ethanol were mixed with 115 ml. dry acetone containing 9.1 g. anhydrous hydrogen chloride, and 13.0 g. AICAR which had previously been dried at 80° C., for three hours in a vacuum were added to the solvent mixture. The resulting solution was kept at room temperature for one hour. The reaction mixture was poured into 0.5 N aqueous ammonia to adjust the pH to 8.0.

The neutralized solution was evaporated in a vacuum, and crystalline isopropylidene-AICAR was precipitated. It weighed 11.4 g. (79%). The melting point of the crystals was 166–170° C. (decomposed).

Only a single spot whose Rf value was 0.82 was detected on a paper chromatogram of the crystals in an n-propanol-conc. ammonia-water system (20:12:3 parts by volume).

The crude crystals were recrystallized from a water-ethanol mixture. The pure crystalline isopropylidene-AICAR melted and decomposed at 170° C. An elementary analysis of the crystals satisfied the expected formula.

Calculated for $C_{12}H_{18}O_5N_4$: C, 48.31%; H, 6.08%; N, 18.78%. Found: C, 48.19%; H, 6.37%; N, 18.38%.

Three grams (10 millimoles) of isopropylidene-AICAR were dissolved in 30 ml. hot ethyl alcohol, 8.0 g. (50 millimoles) potassium ethyl xanthate were added to the solution, and the mixture was heated to 170° C. for 2 hours in a sealed tube. After cooling, a precipitate formed in the reaction mixture was dissolved in 50 ml. water and the pH of the aqueous solution was adjusted to about 3 by stirring with a strongly acidic cation exchange resin of the hydrogen ion type (Amberlite IR-120) at 10° C. The resin was removed by filtration, the filtrate was neutralized with 5 ml. concentrated ammonia water, and the neutralized solution was decolorized with 1 g. active charcoal.

The yield of 2-mercapto-2′,3′-O-isopropylideneinosine in the decolorized solution was measured by paper chromatography using an n-propanol-conc. ammonia-water system (20:12:3 parts by volume) and was found to be almost 100%.

The decolorized solution was evaporated in a vacuum, the precipitate formed was recrystallized from water, and 3.0 g. of pure mono-ammonium salt of 2-mercapto-2′,3′-O-isopropylideneinosine were obtained as yellow, prismatic crystals (yield 83.4%). The crystals melted and decomposed at 241–243° C.

An elementary analysis of the purified crystals agreed with the expected value.

Calculated for $C_{13}H_{19}O_5N_5S$: C, 43.70%; H, 5.32%; N, 19.61%; S, 9.19%. Found: C, 44.00%; H, 5.79%; N, 19.92%; S, 8.96%.

Ultra-violet absorption spectra of the crystals showed $\lambda_{max.}$ 234 and 296 m$\mu$ at pH 1, and $\lambda_{max.}$ 289 m$\mu$ at pH 13.

Absorption bands consistent with the expected structure were found in the infrared absorption spectrum of the crystals.

Only a single spot having an Rf value of 0.65 was detected in a paper chromatogram which was made with the same solvent as described above.

15 g. of the ammonium salt of 2-mercapto-isopropylideneinosine were dissolved in 100 ml. water. 31 ml. 2 N NaOH solution were added to the solution, and thereafter 8.8 g. methyl iodide with stirring at room temperature. The reaction mixture was left standing for 3 hours. Its pH was then adjusted to 5.0 with acetic acid, the Ip-Mes-HxR produced was extracted with 3 batches of 100 ml. chloroform, and the combined extracts were dried with anhydrous sodium sulfate. The chloroform was distilled off in a vacuum, and the residue was recrystallized from ethanol to give 9 g. pure Ip-MeS-HxR which had the following properties:

M.P.=212–213° C. (decomposed)

$[\alpha]_D^{23} = -22.6$ (in a 0.1N NaOH solution C=1)

$\lambda_{max.}^{pH 1} = 270$ m$\mu$, $\lambda_{max.}^{pH 2} = 260$ m$\mu$, $\lambda = _{max.}^{pH 13} = 273$ m$\mu$ Rf in n-propanol system=0.72

Rf in n-butanol system=0.74

Calculated for $C_{14}H_{18}O_5N_4S$: C, 47.45%; H, 5.12%; N, 15.81%. Found: C, 47.71%; H, 5.32%; N, 15.57%.

Example 3

One gram of the sodium salt of 2-mercaptoinosine, prepared from equivalent amounts of NaOH and of the ammonium salt in an obvious manner, was dissolved in 10 ml. water, and 0.526 g. diethyl sulfate was added to the solution drop by drop with stirring, and the mixture was stirred 3 hours more. It was worked up as described in Example 2, and pure crystalline EtS-HxR was obtained in an amount of 0.51 g. It had the following properties:

M.P.=190–191° C.

$[\alpha]_D^{27} = 33.9$ (in an aqueous solution C=1)

$\lambda_{max.}^{pH 1} = 270$ and 274 m$\mu$, $\lambda_{max.}^{pH 7} = 263$, 284(S) m$\mu$ $\lambda_{max.}^{pH\,13} = 230(S), 273$ m$\mu$ $\nu_{max.}^{KBr} = 1120$ cm.$^{-1}$ $\nu_{max.}^{KBr} = 1690$ cm.$^{-1}$ Calculated for $C_{12}H_{16}O_5N_4S$: C, 43.90%; H, 4.91%; N, 17.07%. Found: C, 44.05%; H, 5.06%; N, 17.37%.

Example 4

A mixture of 60 ml. water and 50 ml. 0.1 N NaOH solution was used for dissolving 15 g. ammonium 2-mercaptoisopropylideneinosine. 7.8 g. ethyl iodide were added in dropwise to the solution with stirring, and the mixture was left to stand 3 hours. It was then worked up as in Example 2, and pure crystalline Ip-EtS-HxR was obtained as needles weighing 12 g. It had the following properties:

M.P. = 208–208.5° C. (decomposed)

$\lambda_{max.}^{pH\,1} = 267, 275$ m$\mu$ $\lambda_{max.}^{pH\,7} = 265.5, 285(S)$ $\lambda_{max.}^{pH\,13} = 274(S)$ $\nu_{max.}^{KBr} = 1080$ cm.$^{-1}$ $\nu_{max.}^{KBr} = 1100$ cm.$^{-1}$ $\nu_{max.}^{KBr} = 1380$ cm.$^{-1}$ $\nu_{max.}^{KBr} = 1695$ cm.$^{-1}$ Calculated for $C_{15}H_{20}O_5N_4S$: C, 48.90%; H, 5.47%; N, 15.21%. Found: C, 49.24%; H, 5.52%; N, 15.23%.

Example 5

Two grams of ammonium 2-mercaptoinosine were dissolved in 20 ml. water, 2.1 g. 30% H$_2$O$_2$ solution were added to the aqueous solution, and the mixture was stirred at a temperature between 5 and 10° C., for 15 minutes. The reaction solution was mixed with 30 ml. 30% methylamine solution, and the mixture obtained was heated to 130° C. for 3 hours in an autoclave. The reaction mixture was evaporated in a vacuum, and the residue was recrystallized from water to give 0.86 g. of pure crystalline Me-GR.

The above reaction was repeated with 0.84 g. 30% dimethylamine solution instead of the methylamine, and 0.84 g. pure crystalline DiMe-GR was obtained. Me-GR and DiMe-GR had the following properties:

|  | Me-GR | DiMe-GR |
| --- | --- | --- |
| M.P. (decomp.) | 233° C. | 235–236° C. |
| Rf in n-propanol system | 0.57 | 0.64. |
| Rf in n-butanol system | 0.20 | 0.28. |
| $[\alpha]_D^{26}$ 0.1 N, NaOH C-1 | –42.9° | –35.8°. |
| $\lambda$pH 1, m$\mu$ max. | 260, 285(S) | 266, 295(S). |
| $\lambda$pH 7, m$\mu$ max. | 258, 278(S) | 262, 290(S). |
| $\lambda$pH 13, m$\mu$ max. | 259, 275(S) | 265, 285(S). |

Example 6

Two grams of ammonium 2-mercapto-isopropylidene-inosine were dissolved in 20 ml. water, 3.18 g. 30% H$_2$O$_2$ solution were added, and the solution was stirred at room temperature as in Example 5. The reaction solution was mixed with 30 ml. of an aqueous 30% methylamine solution, and the mixture was heated to 130° C. for 3 hours in an autoclave. The reaction mixture was evaporated in a vacuum to precipitate crude crystals which were recrystallized from water containing a small amount of ammonia, and pure crystalline Ip-Me-GR was obtained in an amount of 0.86 g.

The crystals were identified by elementary analysis:

Calculated for $C_{14}H_{19}O_5N_5$: C, 49.84%; H, 5.68%; N, 20.76%. Found: C, 49.62%; H, 5.59%; N, 20.64.

The above reaction was repeated with dimethylamine instead of methylamine, and 0.79 g. pure crystalline Ip-DiMe-GR was obtained. Its elementary analysis was as follows:

Calculated for $C_{15}H_{21}O_5N_5 \cdot \frac{1}{2}H_2O$: C, 49.99%; H, 6.17%; N, 19.43%. Found: C, 50.41%; H, 6.34%; N, 19.40%.

Ip-Me-GR and Ip-DiMe-GR had the following properties:

|  | Ip-Me-GR | Ip-DiMe-GR |
| --- | --- | --- |
| M.P. (decomp.) | 267–268° C. | 151–152° C. |
| Rf in n-propanol system | 0.72 | 0.76. |
| Rf in n-butanol system | 0.66 | 0.72. |
| $[\alpha]_D^{23}$ | –40° | –19.6°. |
| $\lambda$pH 1, m$\mu$ max. | 262, 285(S) | 267, 298(S). |
| $\lambda$pH 7, m$\mu$ max. | 255, 280() | 261, 290(S). |
| $\lambda$pH 13, m$\mu$ max. | 262, 276(S) | 266, 285(S). |

Example 7

Two grams AICAR were dissolved in a solution of sodium ethylate in ethanol and 1 g. metallic sodium, 6.8 g. ethylacetate were added to the solution, and the mixture was refluxed for 3 hours. 100 ml. water were then added, and the pH was adjusted to 3.0 by stirring with a strongly acidic cation exchange resin of the hydrogen ion type (Amberlite IR–120). The resin was removed by filtration, the filtrate was evaporated in a vacuum to precipitate crude crystals which were recrystallized from water to give 1.7 g. pure Me-HxR having the following properties:

M.P. = 165–166° C.

Rf in n-propanol system = 0.57

Rf in n-butanol system = 0.35

$\lambda_{max.}^{pH\,1} = 253$ m$\mu$ $\lambda_{max.}^{pH\,7} = 251.5$ m$\mu$ $\lambda_{max.}^{pH\,13} = 258$ m$\mu$ Calculated for $C_{11}H_{14}O_5N_4 \cdot \frac{1}{2}H_2O$: C, 45.36%; H, 5.19%; N, 19.24%. Found: C, 45.29%; H, 5.05%; N, 19.21%.

Example 8

Five grams Ip-AICAR were dissolved in a sodium ethylate solution prepared from 200 ml. ethanol and 3 g. sodium, 14.8 g. of ethyl acetate were added with stirring, and the resulting solution was refluxed for 3 hours. The reaction mixture was worked up as described in Example 7, and pure, crystalline 2′,3′-O-isopropylidene-2-methyl inosine was obtained in an amount of 4.75 g., representing a yield of 88%. The crystals melted at 240° C. or more.

The specific rotatory power of the compound in a 0.1 N NaOH solution at 27° C. was –84.5° in sodium D light.

The elementary analysis of the crystals was as follows:

Calculated for $C_{14}H_{18}O_5N_4$: C, 52.17%; H, 5.63%; N, 17.38%. Found: C, 51.80%; H, 5.74%; N, 17.20%.

Ultraviolet absorption spectra of the crystals showed $\lambda_{max}$ 252 m$\mu$ at pH 1, $\lambda_{max}$ 251 m$\mu$ at pH 7, and $\lambda_{max}$ 256 m$\mu$ at pH 13.

Infrared absorption spectra of the crystals by using the KBr dish method showed $\nu_{max}$ 1375 cm.$^{-1}$ which was assumed to be due to the methyl group of

$\nu_{max}$ 1085 cm.$^{-1}$ due to the bond of C—O—C, and $\nu_{max}$ 1390 cm.$^{-1}$ due to a methyl group.

Example 9

The reaction of Example 8 was repeated, but ethyl acetate was replaced by 17.1 g. ethyl propionate. Pure, crystalline 2',3'-O-isopropylidene-2-ethyl inosine was obtained in an amount of 3.82 g., representing a yield of 68%. The crystals melted and decomposed at 212° C.

The specific rotatory power of the crystals was $[\alpha]_D^{27}$ —80.5°.

Ultraviolet absorption spectra of the crystals showed $\lambda_{max}$ 253 m$\mu$ at pH 1, $\lambda_{max}$ 251 m$\mu$ at pH 7 and $\lambda_{max}$ 256 m$\mu$ at pH 13.

Infrared absorption spectra of the crystals showed $\nu_{max}$ 1375 cm.$^{-1}$ which was assumed to be due to a methyl group of

$\nu_{max}$ 1090 cm.$^{-1}$ due to the bond of C—O—C, and $\nu_{max}$ 1050 cm.$^{-1}$ due to the ethyl group.

Example 10

2.8 ml. (31 millimoles) phosphoryl chloride were added with stirring to 20 ml. (171 millimoles) trimethyl phosphate which had been cooled to —10° C., whereupon 5.3 g. (15 millimoles) 2-methyl-mercapto-isopropylideneinosine were added while maintaining a temperature of —5° C. The reaction mixture was stirred for three hours. It turned clear after about 30 minutes. It was then poured into 700 ml. ice water, the pH of the aqueous solution was adjusted to 1.5 with 1 N HNaOH solution, and it was heated to 70° C., for 40 minutes with stirring in order to remove the isopropylidene group. After cooling, hydrolyzed solution was adjusted to pH 2.0 with 1 N HNaOH, and passed through a column packed with 200 ml. of a resin which is copolymer of metaphenylenediamine, resorcin, and formalin. The column was washed with about 300 ml. of water and eluted 0.5 N ammonia water until the effluent was no longer fluorescent. About 2 liters of combined eluates were evaporated to about 150 ml. The concentrate was adjusted to 7.8, the solution was heated for 10 minutes, and the pH was adjusted to 7.8. The solution obtained was treated by charcoal, and the cleared solution was evaporated to give 5.4 g. (76%) of pure crystalline disodium 2-methylmercapto-5'-inosinate dihydrate (MeS-IMP·2Na2H$_2$O) which melted and decomposed at 214–216° C.

A single spot of Rf value 0.35 was detected on a paper chromatogram of the crystals developed with a solvent mixture of i-propanol, saturated ammonium sulfate, and water of 2:79:19 (parts by volume).

The elementary analysis of the crystals was as follows: Calculated for C$_{11}$H$_{13}$O$_8$N$_4$PSNa$_2$·2H$_2$O: C, 27.85%; H, 3.59%; N, 11.81%; P, 6.54%. Found: C, 28.11%; H, 3.49%; N, 12.15%, P, 6.40%.

Ultraviolet absorption spectra of the crystals showed $\lambda_{max}$ 272 m$\mu$ at pH 1, $\lambda_{max}$ 263 and 282(S) m$\mu$ at pH 6, and $\lambda_{max}$ 273.5 m$\mu$ at pH 13. (Note S=shoulder.)

Infrared absorption spectra of the crystals showed max 1070 and 1120 cm.$^{-1}$ which are assumed to be due to the bond C—O—C, $\nu_{max}$ 1215 cm.$^{-1}$ due to the bond C=O, $\nu_{max}$ 1020 and 1045 cm.$^{-1}$ due to the bond P—O—C, and $\nu_{max}$ 1325 due to the methylmercapto group. (The spectra were measured by using the potassium bromide disk method.)

Example 11

To a mixture of 10 ml. cooled phosphoryl chloride and 0.09 ml. water, 3.54 g. 2-methylmercapto-isopropylidene-inosine were added with stirring while maintaining a temperature of 10° C., and the reaction mixture was stored for 6 hours. It was then extracted with ethyl ether, the residue was dissolved in 50 ml. ice water, and the pH of the aqueous solution was adjusted to 1.5. The solution was heated at 70° C. for 40 minutes to remove the isopropylidene group, the hydrolyzation mixture was adjusted to pH 7.8 with sodium hydroxide solution, and it was evaporated to give 3.0 g. crystalline MeS-IMP·2Na·2H$_2$O.

Example 12

6.5 g. (20 millimoles) 2-methylmercapto-inosine were added with stirring to a mixture of 3.7 ml. (40 millimoles) phosphoryl chloride and 50 ml. trimethylphosphate which had been cooled to —5° C., and the solution obtained was stirred at 0° C., for one hour. It turned clear after 30 minutes. The reaction mixture was poured into 500 ml. ice water, and the solution was adjusted to pH 2.0 and passed over a column of 300 ml. resin as in Example 10. Pure crystalline MeS-IMP·2Na·2H$_2$O was obtained from the eluate in a yield of 85%.

Example 13

Forty millilitres trimethylphosphate, 5.52 ml. phosphoryl chloride, 0.18 ml. water, and 5.9 g. 2-ethylmercaptoinosine were treated as in Example 10, and pure, crystalline disodium 2-ethylmercapto-5'-inosinate dihydrate (EtS-IMP·2Na·2H$_2$O) was obtained in an amount of 3.42 g., representing a yield of 38%. It had the following properties:

M.P.=195–205 (decomposed)

Rf value in n-butanol system=0.1

Rf value in i-propanol system=0.42

Rf value in n-propanol system=0.32

$[\alpha]_D^{28}$ = —0.05° (C=1, H$_2$O)

PKa 1=3.07

PKa 2=6.50

$\lambda_{max.}^{pH\ 1}$ = 270 m$\mu$ $\lambda_{max.}^{pH\ 6.6}$ = 264 and 285(S) m$\mu$ $\lambda_{max.}^{pH\ 12.8}$ = 273 m$\mu$ $\nu_{max.}^{KBr}$ = 1080 cm.$^{-1}$ $\nu_{max.}^{KBr}$ = 1220 cm.$^{-1}$ $\nu_{max.}^{KBr}$ = 975 cm.$^{-1}$ $\nu_{max.}^{KBr}$ = 1695 cm.$^{-1}$ Calculated for C$_{12}$H$_{15}$O$_8$N$_4$PSNa·2H$_2$O: C, 29.51%; H, 3.89%; N, 11.48%; P, 6.35%. Found: C, 28.99%; H, 3.62%; N, 11.51%; P, 6.23%.

Example 14

To a mixture of 2.0 ml. trimethylphosphate and 4.12 ml. phosphoryl chloride, 5.5 g. 2-ethyl-mercapto-isopropylideneinosine (Ip-EtS-IMP) were added with stirring while cooling the reaction mixture to —10° C. Stirring was then continued for 2.5 hours. The reaction mixture became clear after 30 minutes, and a precipitate formed after 2.5 hours. The reaction mixture was dissolved in 500 ml. ice water, the aqueous solution was adjusted to pH 1.5 with 4 N HNaOH solution and was left to stand for one hour. It was then adjusted to pH 1.5 and heated to hydrolyze the isopropylidene group. The hydrolyzed solution was adjusted to 2.0 and treated with resin as in Example 1. Pure crystalline EtS-IMP·2Na·2H$_2$O was obtained in an amount of 3.5 g. (47.8%).

Example 15

5.0 g. 2-methyl-isopropylideneinosine were added to 30 ml. acetone and 30 ml. phosphoryl chloride and the mixture was held for about 10 hours at 5–10° C., with stirring. Unreacted phosphoryl chloride was removed by extraction with ethyl ether, the residue was dissolved in ice water, and the aqueous solution was adjusted to pH 2.0. It was then heated to 70° C. for 20 minutes and passed through a column packed with 200 ml. resin as in Example 10. The column was eluted with 0.1 N NaOH solution. The eluate was adjusted to pH 7-8 with a cation exchange resin of the hydrogen ion type, (Amberlite IRC-150), partly evaporated, and diluted with 5 volumes ethanol to precipitate crystals which were recrystallized from water and ethanol to give 2.5 g. (33%)

of pure crystals. The crystals were dried at 80° C. for 2 hours in vacuo in an Adberhaden drier, the crystal water was measured by the Karl Fischer method, and the material was identified by elementary analysis as disodium 2-methyl-5′-inosinate 4.5 hydrates $$Me\text{-}IMP \cdot 2Na \cdot 4\tfrac{1}{2}H_2O$$

having the following properties:

Calculated for $C_{11}H_{13}O_8N_4PNa_2 \cdot 4\tfrac{1}{2}H_2O$: C, 27.10%; H, 4.72%; N, 11.49%; $H_2O$, 16.65%. Found: C, 27.06%; H, 4.89%; N, 11.34%; $H_2O$, 17.9%.

Rf value in n=propanol system=0.26

Rf value in n=butanol system=0.025

$\lambda_{max.}^{pH\,1} = 250$ m$\mu$ $\lambda_{max.}^{pH\,11} = 257$ m$\mu$ $\nu_{max.}^{KBr} = 975$ cm.$^{-1}$ $\nu_{max.}^{KBr} = 1675$ cm.$^{-1}$

Example 16

2-methyl-isopropylideneinosine was replaced in the procedure of Example 15 by 5.0 g. 2-ethyl-isopropylideneinosine, and 2.0 g. pure, crystalline Et-IMP were obtained (27%) as disodium 2-ethyl-5′-inosinate 4.5 hydrates $$Et\text{-}IMP \cdot 2Na \cdot 4.5H_2O$$

having the following properties:

Calculated for $C_{12}H_{15}O_8N_4PNa_2 \cdot 4.5H_2O$: C, 28.74%; H, 4.78%; N, 11.18%; $H_2O$, 16.2%. Found: C, 29.21%; H, 4.89%; N, 11.09%; $H_2O$, 16.8%.

Rf value in n-propanol system=0.34

Rf value in n-butanol system=0.04

$\lambda_{max.}^{pH\,1.0} = 252$ m$\mu$ $\lambda_{max.}^{pH\,11.0} = 257$ m$\mu$ $\nu_{max.}^{KBr} = 980$ cm.$^{-1}$ $\nu_{max.}^{KBr} = 1680$ cm.$^{-1}$

Example 17

Five grams 2-methylinosine were suspended in 30 ml. trimethyl phosphate, and 20 ml. of phosphoryl chloride and 0.2 ml. of water were added to the suspension. The resulting reaction mixture was held at 5–10° C. for 7 hours with stirring. Unreacted phosphoryl chloride was removed by extraction with ethyl ether, and the residue was dissolved in ice water. The solution was spotted on filter paper, developed with a mixed solvent of the n-propanol system, and the spot of Rf value 0.26 was extracted with 0.1 N HCl solution. A maximum was measured at 252 m$\mu$, and 2-methyl-5′-inosinic acid was found to be produced in a yield of 75–80%.

The reaction mixture was adjusted to pH 2.0, passed through a column packed with anion exchange resin of formic acid type (Dowex–1), and the column was eluted with 0.1 normal formic acid. The eluate was adjusted to pH 7.0 with 1 N NaOH solution, partly evaporated in a vacuum, and diluted with ethanol crystals which were recrystallized from aqueous ethanol to give 4.79 g. (54%) pure crystalline Me-IMP·2Na·4.5H$_2$O.

Ultraviolet and infrared absorption spectra, Rf value and elementary analysis of the crystals agreed with those obtained in Example 15.

Example 18

A mixture of 20 ml. trimethyl phosphate and 28 ml. phosphoryl chloride was cooled to −10° C. and 5.41 g. 2-N-methyl-isopropylideneguanosine were added with stirring which continued for 3 hours. The reaction mixture was dissolved in 750 ml. ice water, the aqueous solution was adjusted to pH 1.5 with 0.1 N NaOH solution and heated to 70° C. for 30 minutes. It was then passed at room temperature through a column packed with 200 ml. resin as in Example 10. The resin was washed with water and eluted 0.5 N ammonium hydroxide solution. The combined eluates were evaporated to about 500 ml. The concentrate was adjusted to pH 8.5 with 0.1 N NaOH solution, and 30 ml. of an aqueous solution containing 4 g. barium acetate were added to precipitate crystals which were recovered by centrifuging, washed with water, with ethanol, and then with ethyl ether, and dried at 110° C. for 4 hours. The mother liquor yielded further colorless crystals upon addition of ethanol. The combined crystals which weighed 6.5 were dissolved in 500 ml. water, and 45 ml. Amberlite IR–120 in the sodium form were added to the solution which was stirred for 1.5 hours until clear. The resin was removed by filtration, the filtrate was purified with active charcoal, and evaporated in a vacuum to about 20 ml. Ethanol was added to precipitate disodium 2-N-methylguanosine-5′ - monophosphate Me-GMP·2Na crystals which were dried at 80° C. for 5 hours at 5 mm. Hg, and weighed 4.1 g. (58%).

Me-GMP·2Na has the following properties:

Calculated for $C_{11}H_{14}O_8N_4PNa_2$: C, 30.07%; H, 3.65%; N, 15.95%; P, 7.06%. Found: C, 30.03%; H, 4.11%; N, 15.88%; P, 6.56%.

$\lambda_{max.}^{pH\,1.1} = 261, 288(S)$ m$\mu$ $\lambda_{max.}^{pH\,6.6} = 256, 285(S)$ m$\mu$ $\lambda_{max.}^{pH\,12.8} = 262, 280(S)$ m$\mu$ $\nu_{max.}^{KBr} = 975$ cm.$^{-1}$ $\nu_{max.}^{KBr} = 1100$ mu $\nu_{max.}^{KBr} = 1680$ m$\mu$ Rf value in n-butanol system=0.1

Rf value in i-propanol system=0.42

Rf value in n-propanol system=0.25

$[\alpha]_D^{27.5} = -22.5°$ (C=1, water)

$PKa_1 = 3.17$ $PKa_2 = 6.35$

Example 19

One gram 2-N,N-dimethyl-isopropylideneinosine, 30 ml. phosphoryl chloride, and 0.03 ml. water were reacted as in Example 18. The reaction solution was extracted with 300 ml. petroleum ether, and the residue was dissolved in 150 ml. water. The aqueous solution was adjusted to pH 1.5 and heated to 70° C. for 30 minutes. The solution was then adjusted to pH 2 and passed through a column packed with 120 ml. resin as in Example 10. After washing with 200 ml. water, the resin was eluted with 0.5 N ammonia water, the eluate was evaporated to about 100 ml. in a vacuum and the concentrate was passed over an anion exchange resin of the formic acid type (Dowex–1). The product adsorbed was eluted with 0.5 N formic acid, and the combined eluates were evaporated to dryness in a vacuum. The residue when recrystallized from water consisted of 350 mg. pure crystalline DiMe-GMP having the following properties:

M.P.=190° C., (decomposed).

Calculated for $C_{12}H_{18}O_8N_5P_4{}^3$—$H_2O$: C, 35.60%; H, 4.82%; N, 17.31%; P, 7.66%. Found: C, 35.92%; H, 5.12%; N, 17.71%; P, 7.23%.

$\lambda_{max.}^{pH\,1.1} = 267, 295(S)$ m$\mu$ $\lambda_{max.}^{pH\,6.6} = 262, 288(S)$ m$\mu$ $\lambda_{max.}^{pH\,12.8} = 264, 284(S)$ m$\mu$ Rf value in n-butanol system=0.1

Rf value in i-propanol system=0.44

Rf value in n-propanol system=0.28

Example 20

A reaction mixture of 40 ml. trimethyl phosphate, 5.52 ml. phosphoryl chloride, 0.18 ml. water, and 6.22 g. 2-N,N-dimethylguanosine was prepared at −5° C., and was stirred for 4 hours at 0° C. It was then poured in small batches into 500 ml. ice water, whereupon the aqueous solution formed was adjusted to pH 2.0, and passed over a resin column as in Example 10. The desired product was eluted with 0.5 N $NH_4OH$ solution, the eluate was evaporated in a vacuum to a small volume, and 100 ml. ethanol were added to the concentrate. The crystals precipitated were dissolved in water and precipitated with alcohol. The 3.5 g. pure crystals melted at 179–180° C.

Calculated for $C_{12}H_{16}O_8N_5P \cdot 2Na \cdot 2H_2O$: C, 30.57%; H, 3.40%; N, 14.86%; P, 6.58%. Found: C, 30.21%; H, 3.78%; N, 14.91%; P, 6.25%.

The $R_f$ values in various solvent systems, ultraviolet and infrared absorption spectra agreed with those in Example 19.

Example 21

2-N,N-dimethylguanosine was replaced in the procedure of Example 20 by 5.94 g. 2-N-methylguanosine, and 4.12 g. pure, crystalline Me-IMP·2Na were obtained.

The novel nucleotides, MeS-IMP, EtS-IMP, Ne-IMP, Et-IMP, Me-GMP and DiMe-GMP, and their edible salts have a strong and pleasant taste. The threshold values of the nucleotides in water were determined by a triangle using a panel of 80 testers selected from a large group because of their sensitivity to various tastes, and the following results were obtained:

| 5′ Nucleotide | Threshold Value (percent) | Average (percent) |
|---|---|---|
| MeS-IMP·2Na·2H₂O | 0.0050–0.0013 | 0.0025 |
| EtS-IMP·2Na·2H₂O | 0.0050–0.0013 | 0.0025 |
| Me-IMP·2Na·4½H₂O | 0.005–0.018 | 0.009 |
| Et-IMP·2Na·4½H₂O | 0.004–0.011 | 0.008 |
| Me-GMP·2Na·2H₂O | | 0.03 |
| DiMe-GMP·2Na·2H₂O | | 0.25 |

The panel could not find any taste difference between solutions of disodium 5′-inosinate 7½ hydrates $$IMP \cdot 2Na \cdot 7½H_2O$$

and disodium 5′-guanylate GMP·2Na, in concentrations of twice their threshold values.

It is well known that IMP synergistically enhances the taste of various amino acids, such as monosodium glutamate (MSG), monosodium homocysteinate, monosodium α-aminoadipinate, or monosodium β-hydroxyglutamate. The 5′-nucleotides of the invention show similar synergistic effects of amino acids, and greatly enhance their taste. When solutions containing 0.001 g./dl. of the novel nucleotides and 0.1 g./dl. of the amino acids were compared with solution containing 0.001 g./dl. IMP and 0.1 g./dl. of amino acid, the solutions containing the novel nucleotides were superior to those containing IMP.

The strength of taste of samples containing 0.05% of a 1:100 mixture of 5′-nucleotide and MSG was evaluated by the panel according to an empirical scale on which the strength of the IMP mixture was assumed to be 1.0.

Nucleotide: Strength of taste
- IMP·2Na·7½H₂O _____ 1.0
- MeS-IMP·2Na·2H₂O _____ 9.8–10
- EtS-IMP·2Na·2H₂O _____ 7.5
- Me-IMP·2Na·4½H₂O _____ 2.4
- Et-IMP·2Na·4½H₂O _____ 2.5
- Me-GMP·2Na·2H₂O _____ 3.3
- DiMe-GMP·2Na·2H₂O _____ 2.6

The novel 5′-nucleotides and their salts are not as readily decomposed by some phosphomonoesterases occurring in foods as the naturally occurring 5′-nucleotides, such as 5′-inosinic acid or 5′-guanylic acid.

$\frac{1}{100}$ molar aqueous solution of the 5′-nucleotides listed below were incubated with various phosphodiesterases under the optimum operating conditions of the enzymes for equal periods, and the liberated phosphate ions were determined as listed below.

| Enzyme | Phosphate (percent) liberated from — | | | | | | |
|---|---|---|---|---|---|---|---|
| | IMP | MeS-IMP | EtS-IMP | Me-IMP | Et-IMP | Me-GMP | DiMe-GMP |
| Alkali phosphomonoesterase [1] | 100 | 66 | 66 | | | 78 | 78 |
| Takadiastase [2] | 100 | 67 | 67 | 66 | 66 | | |
| Acid phosphomonoesterase [3] | 100 | | | 68 | 68 | | |
| Acid phosphomonoesterase [4] | 100 | | | | | 82 | 82 |

[1] Extracted from muscle of *Argyrosomus artentatus*.
[2] Brand name of an *Aspergillus amylase* containing several enzymes.
[3] Extracted from cucumber.
[4] Prepared from rice-bran.

As is apparent from the above table, the 5′-nucleotides of the invention can maintain their taste longer than IMP.

The 5′-nucleotides of the invention improve the flavor of foods and beverages, such as meat products, processed seafood, fermentation products including certain sauces and wine, milk products, soups, or various dressings, and enhance the natural flavor. They may be used singly as crystals or aqueous solutions, and as seasoning mixtures with table salt, MSG, IMP, or GMP.

The same or closely similar taste improvements are achieved by use of the physiologically tolerated salts of the 5′-nucleotides of the invention with physiologically tolerated cations which do not have significant tastes of their own. Typical examples are the alkali metal or alkaline earth metal salts, such as the sodium, potassium, calcium, magnesium, and ammonium salts, and the salts of various amino acids, such as hystidine, lysine or arginine.

The nucleotides of the invention are used in the aforementioned synergistic mixtures in smaller amounts than IMP for the same effect.

Example 22

A soup was prepared from chicken, carrots, and onion, and was seasoned with pepper, table salt, monosodium glutamate. MeS-IMP·2Na·2H₂O was added to the soup in an amount of 0.02 g. per liter. A second batch of the soup was prepared with an equal amount of $$IMP \cdot 2Na \cdot 7½H_2O$$

The two soups were tasted by a panel of 20 experienced tasters, all of whom considered the taste of the sample containing MeS-IMP to be stronger than that of the soup containing IMP, and 18 panel members preferred the former.

In an analogous comparison test, a soup prepared with 0.02 g. EtS-IMP·2Na·H₂O per liter was found stronger in taste than one prepared with 0.2 g. IMP·2Na·7½H₂O by a panel of 40 tasters, and 23 of the panel members preferred the taste of the soup prepared with the nucleotide of the invention.

A panel of 25 tasters gave a similar verdict in a comparison test of cream soups prepared each from chicken, carrots, onion, spinach, wheat flour, pepper, salt, monosodium glutamate, and respectively containing 0.06 g. DiMe-GMP and 0.2 g. IMP-2Na·7½H₂O. All tasters agreed that the soup containing the DiMe-GMP had a stronger taste, and 23 of the 25 preferred it.

Example 23

An aqueous solution containing 10 g.

$$MeS-IMP \cdot 2Na \cdot 2H_2O$$

and 10 g. soluble starch was sprayed on each kilogram of a stream of monosodium glutamate crystals suspended in flowing air until the aqueous coating was dried. A granular, highly effective seasoning material was thereby obtained.

Other effective seasoning compositions were prepared by the same method from one kilogram of monosodium glutamate crystals and sprayed solutions of 12 g.

$$EtS\text{-}IMP \cdot 2Na \cdot 2H_2O$$

and 10 g. soluble starch, of 10 g. each of $$Me\text{-}IMP\text{-}2Na \cdot 4\tfrac{1}{2}H_2O$$

and soluble starch, and of 10 g. each of DiMe-GMP and soluble starch.

Example 24

0.15 g. MeS-IMP·2Na·2H$_2$O was added to one liter of sterilized raw soy sauce, and the soy sauce was aged for 3 months at room temperature. The MeS-IMP was replaced in another bath of the same sauce by 1.5 g. IMP·2Na·7½H$_2$O, and similar soy sauce was prepared. The aged soy sauce prepared with a much smaller amount of the compound of the invention had a much stronger taste, than the aged sauce containing IMP·2Na·7½H$_2$O.

A soup of "Hampen" (a processed fish product made mainly of minced fish meat and starch) seasoned with the aged soy sauce containing MeS-IMP, tasted good and left a pleasing after-taste.

Example 25

An instant soup mix was prepared by grinding together 50 g. table salt, 10 g. sugar, 3 g. paste of pork extract, 10 g. sodium glutamate, 10 g. lard, 0.6 ml. acetic acid, 4.9 g. pepper, 1 g. caramel, 1 g. garlic powder, 0.1 g. glycerol monostearate and 0.5 g. MeS-IMP·2Na·2H$_2$O.

Example 26

10 kg. minced meat of *Sciaena schlegelli*, a marine food fish common in Japan, was ground for 15 minutes, whereupon 30 g. table salt were added, and grinding continued for 15 minutes. 800 g. starch, 400 g. sucrose, 100 g. monosodium glutamate, and 1.2 g. MeS-IMP·2Na·2H$_2$O were added thereafter, and the mixture was further ground for 15 minutes. The fish paste was mounted on a board, and cooked at 95° C. for 30 minutes. An otherwise identical second cooked fish-paste was prepared with 3.0 g. IMP·2Na·7½H$_2$O instead of the MeS-IMP. The first boiled fish-paste tasted better and left a better after-taste than the second. The comparative taste results were obtained after the fish-pastes had been stored 5 days in a refrigerator.

After the two fish-pastes had been stored for 7 days at ambient temperature, they were extracted with water, protein was removed from the extracts, and the amount of libearted inorganic phosphate was determined. 62 percent of the 5'-nucleotide was still present in the fish prepared with MeS-IMP·2Na·2H$_2$O, but only less than 10% in that prepared with IMP·2Na·7½H$_2$O.

Example 27

A pickling solution was prepared from 1 kg. table salt, 50 g. monosodium glutamate, 0.2 g. Et-IMP·2Na·4½H$_2$O, 200 g. sugar, 50 g. sodium nitrate and 5 liters of water. 10 kg. chopped beef were soaked in the solution for one week at 2–3° C. The pickled or corned beef was washed and boiled in water for 15 to 20 minutes. It was then cooled quickly, fat and tendons were removed, and the clean meat was minced, ground, packed in cans, and sterilized in the open cans for 2 hours at a gage pressure of 5 kg./cm.², whereafter the cans were sealed in a vacuum in the usual manner.

When the corned beef cans were opened 2 months later, the contents tasted as good as when freshly prepared.

Me-GMP·2Na·2H$_2$O had the same effect as $$Et\text{-}IMP\cdot 2Na\cdot 4\tfrac{1}{2}H_2O$$

in the amount.

Example 28

The heads and internal organs were removed from tunny, and the remainder was maintained at 120° C. for 2 hours in a retort. After cooling, the tunny was cleaned, minced, and the meat was packed in ½ pound cans.

40 ml. of a brine prepared from 1 liter of water, 65 g. NaCl, 7.5 g. monosodium glutamate, and 1.1 g. Me-GMP·2Na·2H$_2$O were added to the contents of each can which was then sealed in a vacuum. The cans were sterilized at 112° C. for 70 minutes.

Me-GMP was replaced by 1.1 g. IMP·2Na·7½H$_2$O in cans of tunny prepared in an otherwise identical manner.

After 2 months samples of both batches were opened and compared by a panel of 20 testers, all of whom found the sample containing Me-GMP to have a stronger taste than that containing IMP. 18 panelists preferred the taste of the former.

Although the nucleotides of the invention differ from the known inosinic and guanylic acids only by substituents in position 2, they have superior resistance to the normal food enzymes which tend to destroy inosinic and guanylic acid by hydrolysis at the phosphate ester bond. This effect is common to all nucleotides of this invention and is observed even when the substituent is only a methyl radical replacing hydrogen in the structure of the natural nucleotide. It is specific to substitution in the 2-position.

The reason for the stronger taste provided even by smaller quantities of the several nucleotides than by the natural nucleotides is not fully understood at this time because of the scant available knowledge of the biochemical aspects of taste. This quantitative superiority of the nucleotides of the invention also is believed to be peculiar to substitution in the 2-position, and no other substitution products having similarly strong taste enhancing properties have been found.

While the invention has been described with particular reference to specific embodiments, it is to be understood that it is not limited thereto, but is to be construed broadly and restricted solely by the scope of the appended claims.

What we claim is:

1. A process of improving and enhancing the flavor of foods, beverages, and seasonings which comprises adding thereto an effective amount of one of the nucleotides 2-methylinosine-5'-monophosphate, 2-ethylinosine-5'-monophosphate, 2-methyl-mercaptoinosine-5' - monophosphate, 2 - ethylmercaptoinosine-5'-monophosphate, 2-N-methylguanosine-5'-monophosphate or 2-N,N - dimethylguanosine-5'-monophosphate, or a physiologically tolerated, water-soluble salt of said nucleotide with ammonium, an alkali metal, an alkaline earth metal, or an amino acid.

2. A process as set forth in claim 1, wherin said nucleotide or salt thereof is added in a minor amount jointly with a major amount of monosodium glutamate.

3. A compound of the formula:

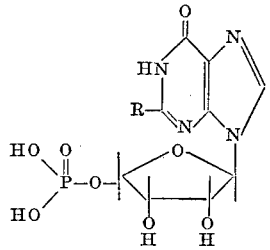

wherein R is methylmercapto, ethylmercapto, methyl, ethyl, methylamino or dimethylamino.

4. A compound as set forth in claim 3, wherein R is methyl-mercapto.

5. A compound as set forth in claim 3, wherein R is methyl-mercapto.

6. A compound as set forth in claim 3, wherein R is methyl.

7. A compound as set forth in claim 3, wherein R is ethyl.

8. A compound as set forth in claim 3, wherein R is methyl-amino.

9. A compound as set forth in claim 3, wherein R is dimethyl amino.

References Cited

UNITED STATES PATENTS

| | | | |
|---|---|---|---|
| 3,120,511 | 2/1964 | Tanaka et al. | 260—211.5 |
| 3,296,087 | 1/1967 | Mitsugi et al. | 260—211.5 |
| 3,014,900 | 12/1961 | Schroeder | 260—211.5 |
| 3,170,917 | 2/1965 | Laufer et al. | 260—211.5 |
| 3,201,388 | 8/1965 | Tsuchiya et al. | 260—211.5 |
| 3,282,920 | 11/1966 | Ouchi et al. | 260—211.5 |
| 3,290,285 | 1/1966 | Senoo et al. | 260—211.5 |

LEWIS GOTTS, *Primary Examiner.*

JOHNNIE R. BROWN, *Assistant Examiner.*